(12) United States Patent
Yu (10) Patent No.: US 9,743,227 B1
(45) Date of Patent: Aug. 22, 2017

(54) TIMING SYSTEM ENABLING NEAR FIELD COMMUNICATION CONTROLS

(71) Applicant: Chao-Cheng Yu, Taoyuan (TW)

(72) Inventor: Chao-Cheng Yu, Taoyuan (TW)

(73) Assignee: Chao-Cheng Yu, Taoyuan (TW)

( * ) Notice: Subject to any disclaimer, the term of this patent is extended or adjusted under 35 U.S.C. 154(b) by 0 days.

(21) Appl. No.: 15/381,798

(22) Filed: Dec. 16, 2016

(51) Int. Cl.
*H04B 5/00* (2006.01)
*H04W 4/00* (2009.01)
*H04L 29/06* (2006.01)

(52) U.S. Cl.
CPC .......... *H04W 4/008* (2013.01); *H04B 5/0037* (2013.01); *H04L 69/28* (2013.01)

(58) Field of Classification Search
CPC ....... H04W 4/008; H04B 5/0037; H04L 69/28
USPC ..................... 455/41.1, 41.2, 41.3
See application file for complete search history.

(56) References Cited

U.S. PATENT DOCUMENTS

| 9,398,531 | B1 * | 7/2016 | Zhang | H04W 52/0209 |
| 2011/0111700 | A1 * | 5/2011 | Hackett | A01G 25/16 455/41.2 |
| 2014/0189406 | A1 * | 7/2014 | Hung | G06F 1/1698 713/323 |
| 2014/0349572 | A1 * | 11/2014 | Ben-Shalom | H04B 5/0031 455/41.1 |
| 2015/0099464 | A1 * | 4/2015 | Kiat | H01H 71/00 455/41.1 |
| 2015/0134510 | A1 * | 5/2015 | O'Donoghue | G06F 3/048 705/39 |

* cited by examiner

*Primary Examiner* — Md Talukder
(74) *Attorney, Agent, or Firm* — WPAT, P.C., Intellectual Property Attorneys; Anthony King (57) ABSTRACT

A timing system enabling near field communication (NFC) controls comprises a timing controller and an application program installed on a carrier including an NFC antenna and enabling user's receptions, wherein the timing controller is electrically connected to a power grid end and at least a load end, and the application program includes a power supply setup module and an operation interface module; herein the power supply setup module is used to configure the power supply setup parameters of the timing controller and transfer such power supply setup parameters to the timing controller in a form of NFC signals so that the timing controller can control the power supply status of the load end based on the power supply setup parameters and the user is able to achieve the power supply controls at the load end merely by tapping on the application program.

9 Claims, 12 Drawing Sheets

TIMING SYSTEM ENABLING NEAR FIELD COMMUNICATION CONTROLS

BACKGROUND OF THE INVENTION

1. Field of the Invention

The present invention generally relates to a timing system enabling near field communication (NFC) controls; in particular, it concerns a timing system allowing to transfer the power supply setup parameters capable of controlling at least a load end in a form of NFC transmissions such that the user can control the power supply of the at least a load end simply by pressing down the application program.

2. Description of Related Art

It is well-known that most of the electric power socket devices enabling the timing feature may be equipped with a timer which may be a type of mechanical countdown timer; taking this sort of timer including a wheel disc as an example, a user may need to rotate the wheel disc installed on the timer so as to set up the countdown duration of time to control the power supply time of the electric power socket device thereby saving the power consumption of the electric devices plugged into the electric power socket device.

However, this type of mechanical countdown timers may be simple and direct, the number of wheel disc rotations just represents the extent of the intended power supply time, so it can not be configured to operate for longer power supply time; besides, since the available power supply time that the mechanical countdown timer can be rotated to may be limited, users actually don't have quite much choice for the desired length of power supply time.

Moreover, conventional mechanical or electrical timers need multiple timing components and liquid crystal display, which may undesirably cause significant increments on the manufacture costs of the timers and thus fail to meet the demand on economic efficiency.

Therefore, to allow the user to set up the power supply time more conveniently, the present invention may be an optimal solution if it is possible to configure the power supply time parameters in advance via the APP and then transfer such power supply time parameters to the timing controller in a way of NFC signals such that the timing controller, after receptions of the power supply time parameters, can further control the electrically connected load end in order to control the power supply status of the load end based on the received power supply time parameters, so that the user needs only to tap on the application program to achieve the controls over the power supply at the load end thereby eliminating the installations of timing buttons and liquid crystal display.

SUMMARY OF THE INVENTION

A timing system enabling near field communication (NFC) controls comprises: a timing controller, electrically connected to a power grid end and at least a load end, in which the timing controller includes: an alternative current (AC) power source input module, used to input AC power; a direct current (DC) power source supply module, which is electrically connected to the AC power source input module and used to convert the AC power into the DC power; an AC power source output module, which is electrically connected to a load end in order to output the AC power to the load end; a relay, which is electrically connected to the AC power source input module, the DC power source supply module and the AC power source output module, wherein the relay is used to control whether the AC power inputted by the AC power source input module should pass through the relay to supply the power to the AC power source output module such that the AC power source output module can output the AC power to the load end; a central control module, which is electrically connected to the DC power source supply module in order to control the integral operation mechanism of the timing system enabling near field communication controls; a relay driver circuit, which is electrically connected to the central control module and the relay, in which the central control module is able to connect to the relay by means of the relay driver circuit such that electric power can be supplied to the AC power source output module; a near field communication transceiving controller, electrically connected to the central control module and the DC power source supply module so as to transfer and receive at least an NFC signal; a power supply status indicator set, including at least a power supply status indicator and electrically connected to the central control module, in which the actions of the power supply status indicators represent the power supply output status; a near field communication transmission indicator set, including at least an NFC transmission indicator and electrically connected to the central control module, in which the actions of the NFC transmission indicators represent the NFC signal transmission status; a power supply status selection control button, electrically connected to the central control module, in which the power supply status selection control button can be pressed down to control the power source output status; a near field communication transmission status control button, electrically connected to the central control module, in which the near field communication transmission status control button can be pressed down for a certain duration of time to enable the near field communication transmission indicator set and start to transmit NFC signals; an application program, installed on a carrier including an NFC antenna and enabling user's receptions, and the carrier enabling user's receptions can perform NFC signal receptions and transfers with the timing controller, herein the application program comprises: a power supply setup module, used to configure the power supply setup parameters of the time controller and transfer such power supply setup parameters to the timing controller in a way of NFC signals, such that the near field communication transceiving controller can transfer the received power supply setup parameters to the central control module which then adjusts the power supply status of the load end in accordance with the power supply setup parameters; and an operation interface module, electrically connected to the power supply setup module thereby providing the operation interface for executions of the application program.

In a preferred embodiment, the enabled power supply status indicator set can light on thus indicating power supply is activated.

In a preferred embodiment, the enabled power supply status indicator set can light off thus indicating power supply is deactivated.

In a preferred embodiment, the near field communication transmission indicator set can light on thus indicating the start of NFC signal transmission receptions.

In a preferred embodiment, the near field communication transmission indicator set can blink thus indicating receiving NFC signal transmissions.

In a preferred embodiment, the near field communication transmission indicator set can light off thus indicating the end of NFC signal transmission receptions.

In a preferred embodiment, the near field communication transmission status control button can be pressed down for 2 seconds to enable the near field communication transmission indicator set to light on and start to transmit NFC signals.

In a preferred embodiment, further comprising a reset circuit electrically connected to the central control module, in which the reset circuit is, upon repowering, used to provide the central control module with the reset signal.

In a preferred embodiment, it further comprises a potential boost circuit electrically connected to the central control module and the near field communication transceiving controller, in which the potential boost circuit can be applied to elevate the potential of the signals transmitted by the near field communication transceiving controller.

DETAILED DESCRIPTION OF THE PREFERRED EMBODIMENTS

Other technical contents, aspects and effects concerning the present invention can be clearly appreciated through the detailed descriptions on the preferred embodiments of the present invention in conjunction with the appended drawings.

Refer initially to FIGS. 1-3C, wherein an integral structure view, a structure view of the timing controller, an internal architecture view of the timing controller, an internal partial architecture view of the timing controller, an architecture view of the DC power source supply module, a partial electric circuit architecture view and a partial electric circuit architecture view for the timing system enabling near field communication controls according to the present invention are respectively shown. It can be observed from the Figures that the timing controller 1 performs data transmissions with an application program 42 by way of an NFC connection, the application program 42 is installed on a carrier 4 including an NFC antenna 41 and enabling user's receptions, and the carrier 4 enabling user's receptions can perform NFC signal receptions and transfers with the timing controller 1.

Figure 1:
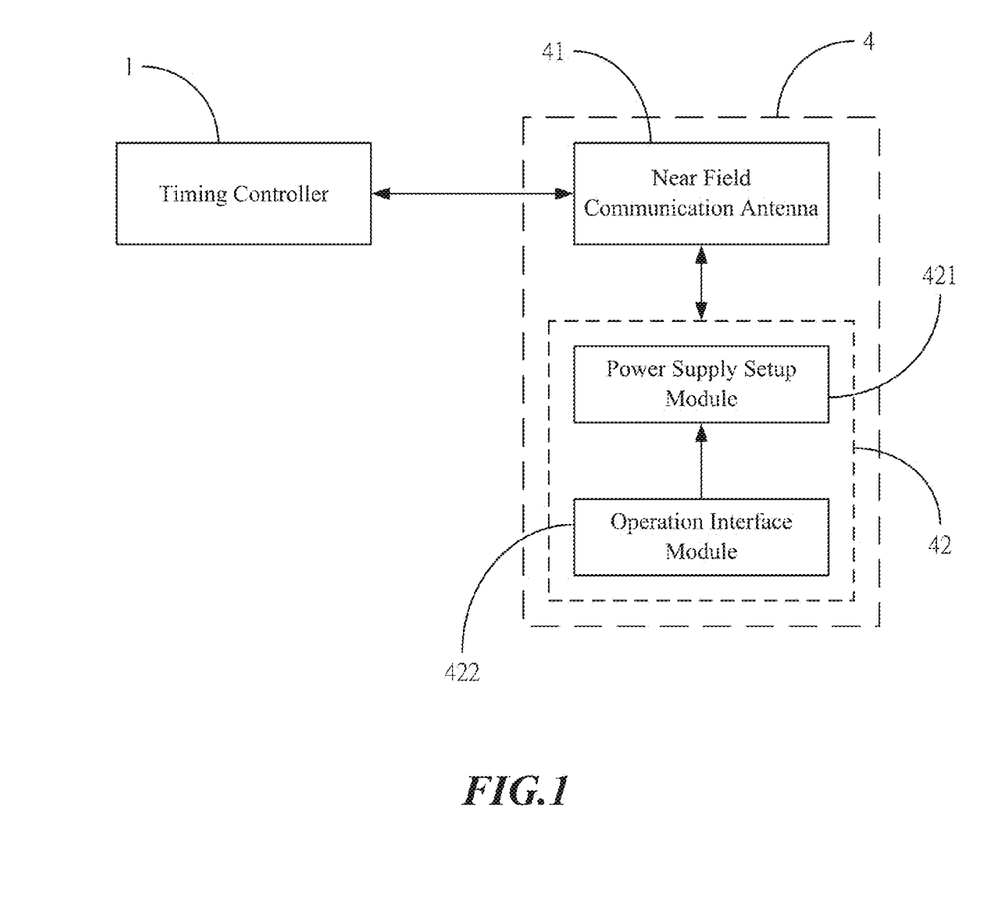
FIG. 1 shows an integral structure view of the timing system enabling near field communication controls according to the present invention.

The application program 42 comprises a power supply setup module 421 and an operation interface module 422, wherein the power supply setup module 421 can be applied to configure the power supply setup parameters of the timing controller 1 and transfer such power supply setup parameters to the timing controller 1 in a form of NFC signals, so that the near field communication transceiving controller 1107 can transfer the received power supply setup parameters to the central control module 1105 which then adjusts the power supply status of the load end 3 in accordance with the power supply setup parameters; meanwhile, the operation interface module 422 is electrically connected to the power supply setup module 421 thereby providing operation interface for executing the application program 42.

Figure 2A:
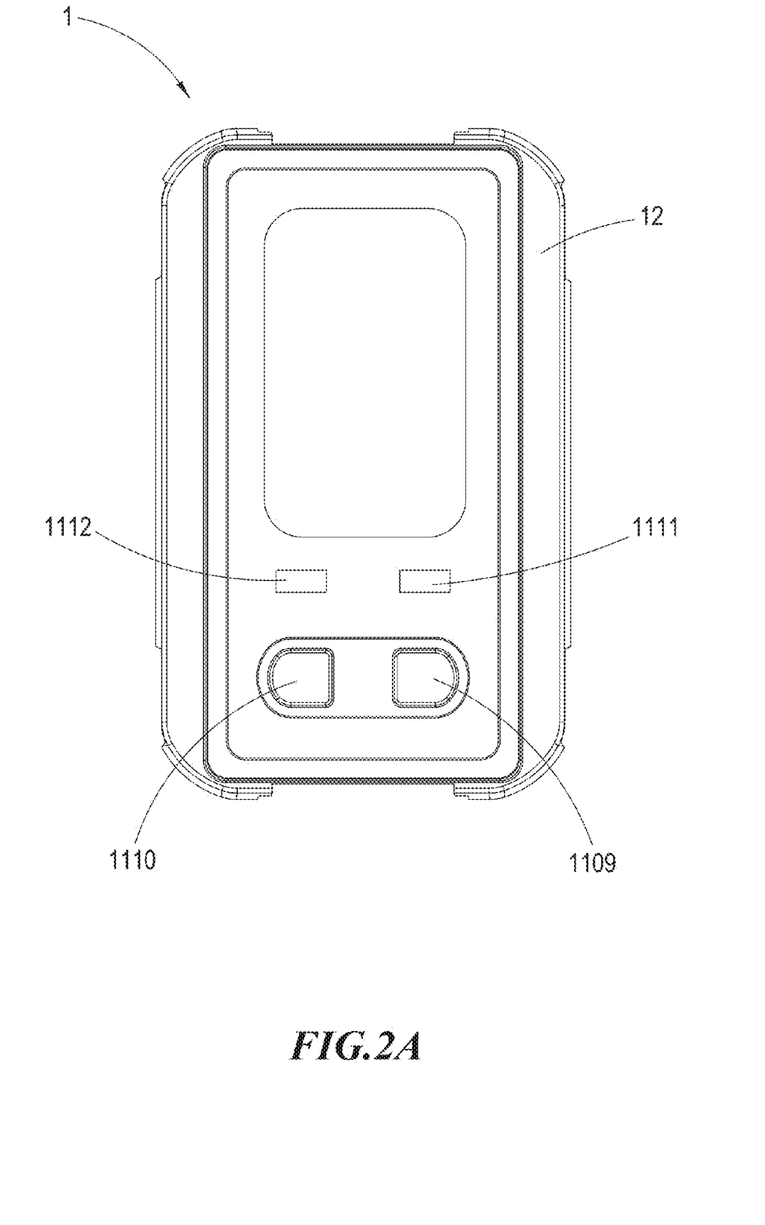
FIG. 2A shows a structure view of the timing controller configured in the timing system enabling near field communication controls according to the present invention.
Figure 2B:
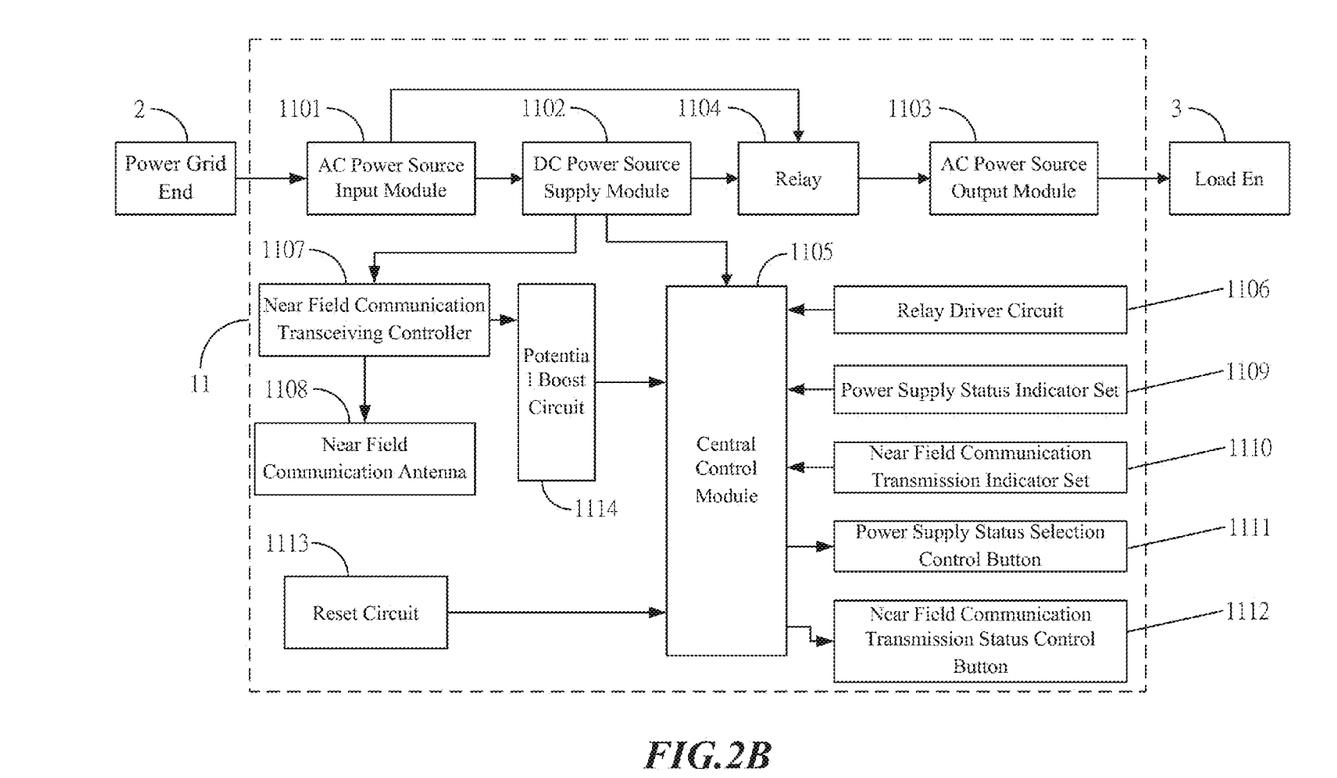
FIG. 2B shows an internal architecture view of the timing controller configured in the timing system enabling near field communication controls according to the present invention.

Next, as shown in FIGS. 2A and 2B, the timing controller 1 is electrically connected between a power grid end 2 and a load end 3, wherein the timing controller 1 includes a housing 12 and a electric circuit board 11 installed within the housing 12, and the electric circuit board 11 further includes an alternative current (AC) power source input module 1101, a direct current (DC) power source supply module 1102, an AC power source output module 1103, a relay 1104, a central control module 1105, a relay driver circuit 1106, an NFC transceiving controller 1107, an NFC antenna 1108, a power supply status indicator set 1109, an NFC transmission indicator set 1110, a power supply status selection control button 1111, an NFC transmission status control button 1112, a reset circuit 1113 and a potential boost circuit 1114.

Figure 3A:
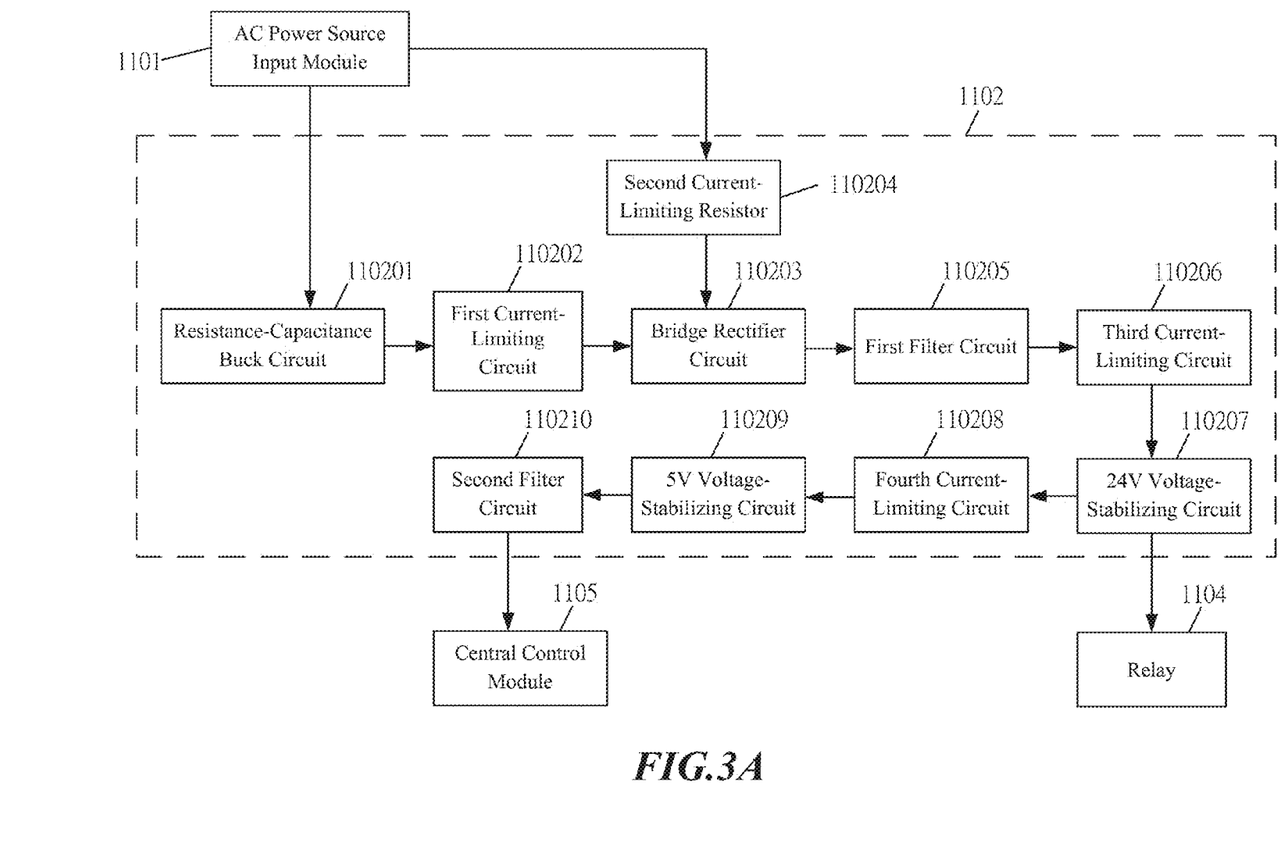
FIG. 3A shows an architecture view of the DC power source supply module configured in the timing system enabling near field communication controls according to the present invention.
Figure 3B:
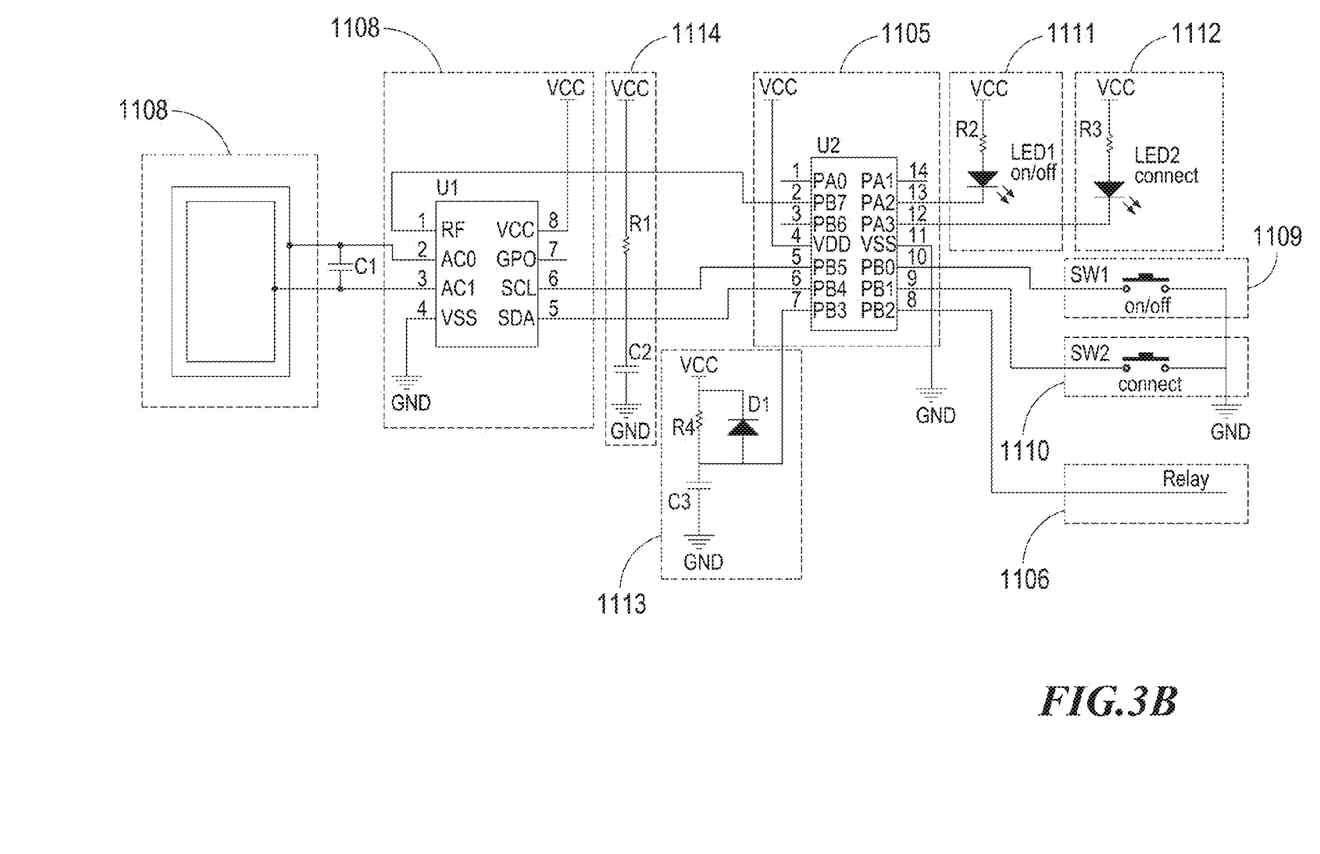
FIG. 3B shows a partial electric circuit architecture view of the timing system enabling near field communication controls according to the present invention.
Figure 3C:
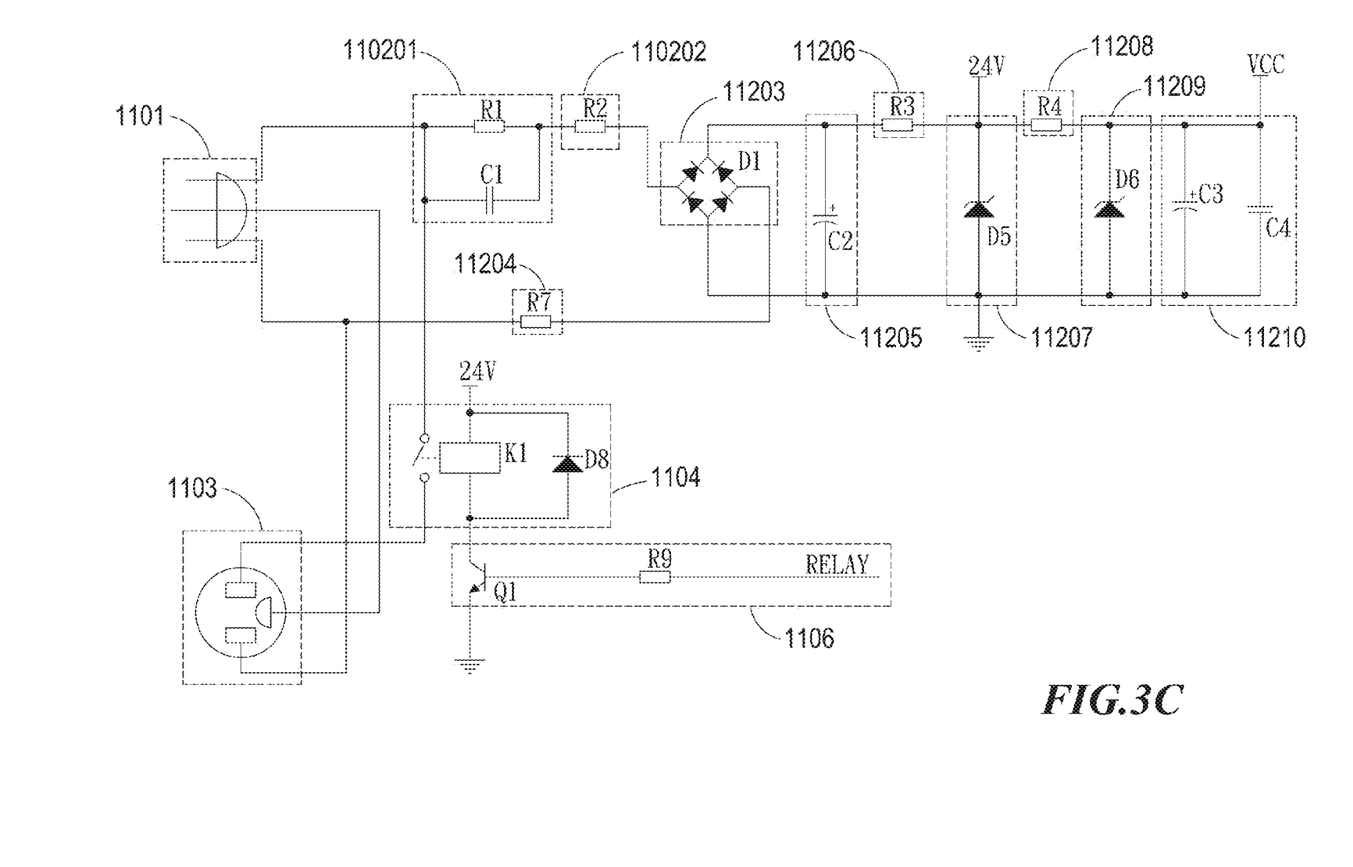
FIG. 3C shows a partial electric circuit architecture view of the timing system enabling near field communication controls according to the present invention.

Herein the AC power source input module 1101 can operate to input AC electric power, and the DC power source supply module 1102 is electrically connected to the AC power source input module 1101 and operates to convert AC power into DC power. As shown in FIGS. 3A-3C, the DC power source supply module 112 includes a resistance-capacitance buck circuit 110201, a first current-limiting circuit 110202, a bridge rectifier circuit 110203, a second current-limiting circuit 110204, a first filter circuit 110205, a third current-limiting circuit 110206, a 24V voltage-stabilizing circuit 110207, a fourth current-limiting circuit 110208, a 5V voltage-stabilizing circuit 110209 and a second filter circuit 110210.

Herein the resistance-capacitance buck circuit 110201 is applied to limit the maximal operation current by means of the capacitive reactance generated by the capacitor under a fixed AC signal frequency, and the bridge rectifier circuit 110203 can be electrically connected to the resistance-capacitance buck circuit 110201 via the first current-limiting circuit 110202 thereby rectifying the AC power source coming from the AC power source input module 1101 into the pulsed DC power source. Moreover, the second current-limiting resistor 110204 can be further installed between the AC power source input module and the bridge rectifier circuit.

The rectified pulsed DC power inputted by the bridge rectifier circuit can be transformed into stable DC power by means of the first filter circuit 110205. Next, through the 24V voltage-stabilizing circuit 110207 electrically connected between the third current-limiting resistor 110206 and the first filter circuit 110205, it is possible to voltage stabilize the DC power inputted by the first filter circuit 110205 to a voltage of 24V thereby supplying electric power to the relay 1104 for operations.

Subsequently, with the 5V voltage-stabilizing circuit 110209 electrically connected to the 24V voltage-stabilizing circuit via the fourth current-limiting circuit 110208, it is possible to voltage stabilize the DC power inputted by the 24V voltage-stabilizing circuit 110207 to the voltage of 5V. Then, through the second filter circuit 110210, it is possible to stabilize the DC power outputted by the 5V voltage-stabilizing output circuit 110209 so as to provide stable DC power to the central control module 1105 for operations.

Besides, the AC power source output module 1103 is electrically connected to the load end 3 in order to output the AC power to the load end 3. In addition, the relay 1104 is electrically connected to the AC power source input module 1101, the DC power source supply module 1102 and the AC power source output module 1103, wherein the relay 1104 is used to control whether the AC power inputted by the AC power source input module 1103 should pass through the relay 1104 to supply the power to the AC power source output module 1103 such that the AC power source output module 1103 can output the AC power to the load end 3.

Also, the central control module 1105 is electrically connected to the DC power source supply module 1102 in order to control the integral operation mechanism of the timing controller 1. The near field communication transceiving controller 1107 is electrically connected to the central control module 1105 and the DC power source supply module 1102, and further electrically connected to an NFC antenna 1108 so as to transfer and receive at least an NFC signal, and the NFC transceiving controller 1107 is able to process the received and transferred NFC signals.

Figure 2C:
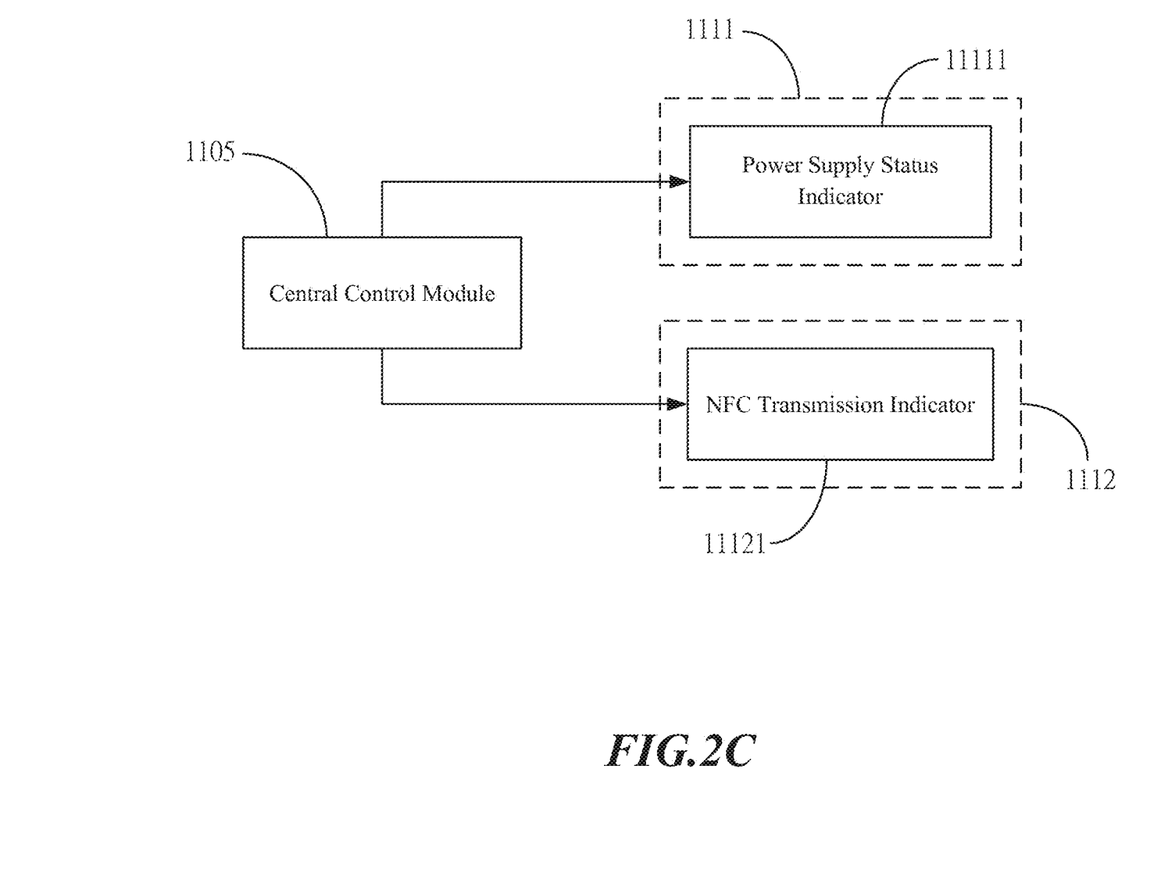
FIG. 2C shows an internal partial architecture view of the timing controller configured in the timing system enabling near field communication controls according to the present invention.

As shown in FIG. 2C, the power supply status indicator set 1111 includes at least a power supply status indicator 11111 and is electrically connected to the central control module 1105, in which the actions of the power supply status indicators 1111 represent the power supply output status. The power supply status indicators 1111 may operate as below:

(1) the enabled power supply status indicator set can light on thus indicating power supply is activated.

(2) the disabled power supply status indicator set can light off thus indicating power supply is deactivated.

Moreover, as shown in FIG. 2C, the near field communication transmission indicator set 1112 includes at least an NFC transmission indicator 11121 and is electrically connected to the central control module 1105, in which the actions of the NFC transmission indicators 1112 represent the NFC signal transmission status and can operate as below:

(1) the near field communication transmission indicator set can light on thus indicating the start of NFC signal transmission receptions.

(2) the near field communication transmission indicator set can blink thus indicating receiving the NFC signal transmissions.

(3) the near field communication transmission indicator set can light off thus indicating the end of NFC signal transmission receptions.

Moreover, the power supply status selection control button 1109 is electrically connected to the central control module 1105, and the power supply status selection control button 1109 can be pressed down to control the power source output status. Also, the near field communication transmission status control button 1110 is electrically connected to the central control module 1105, and the near field communication transmission status control button 1110 can be pressed down for a certain duration of time (e.g., circa 2 seconds) to enable the near field communication transmission indicator set 1112 and start to transmit NFC signals.

Besides, upon repowering, the reset circuit 1113 can be used to provide the central control module 1105 with the reset signal, and the potential boost circuit 1114 can be applied to elevate the potential of the signals transmitted by the near field communication transceiving controller 1107.

Figure 4A:
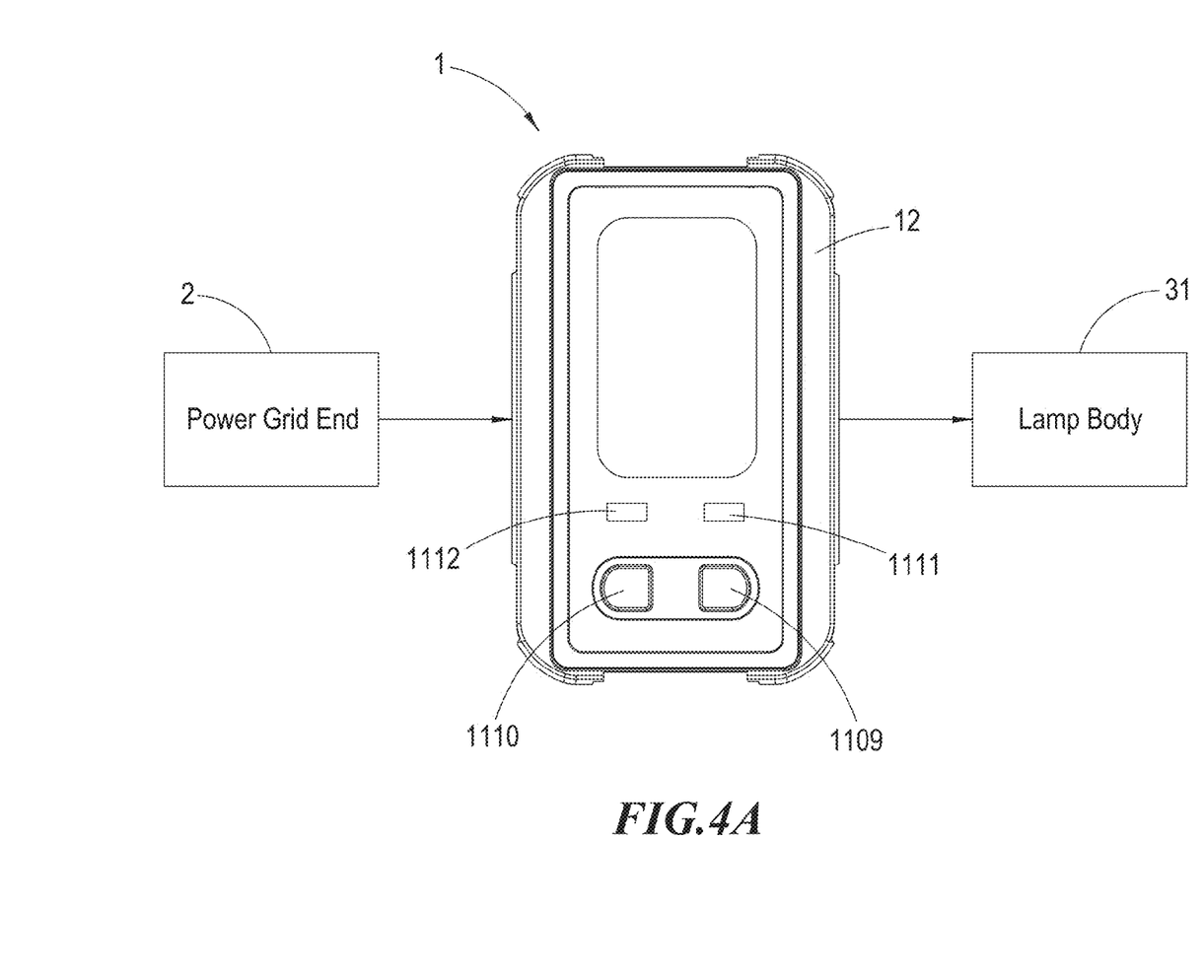
FIG. 4A shows an application architecture view of the timing system enabling near field communication controls according to the present invention.
Figure 4B:
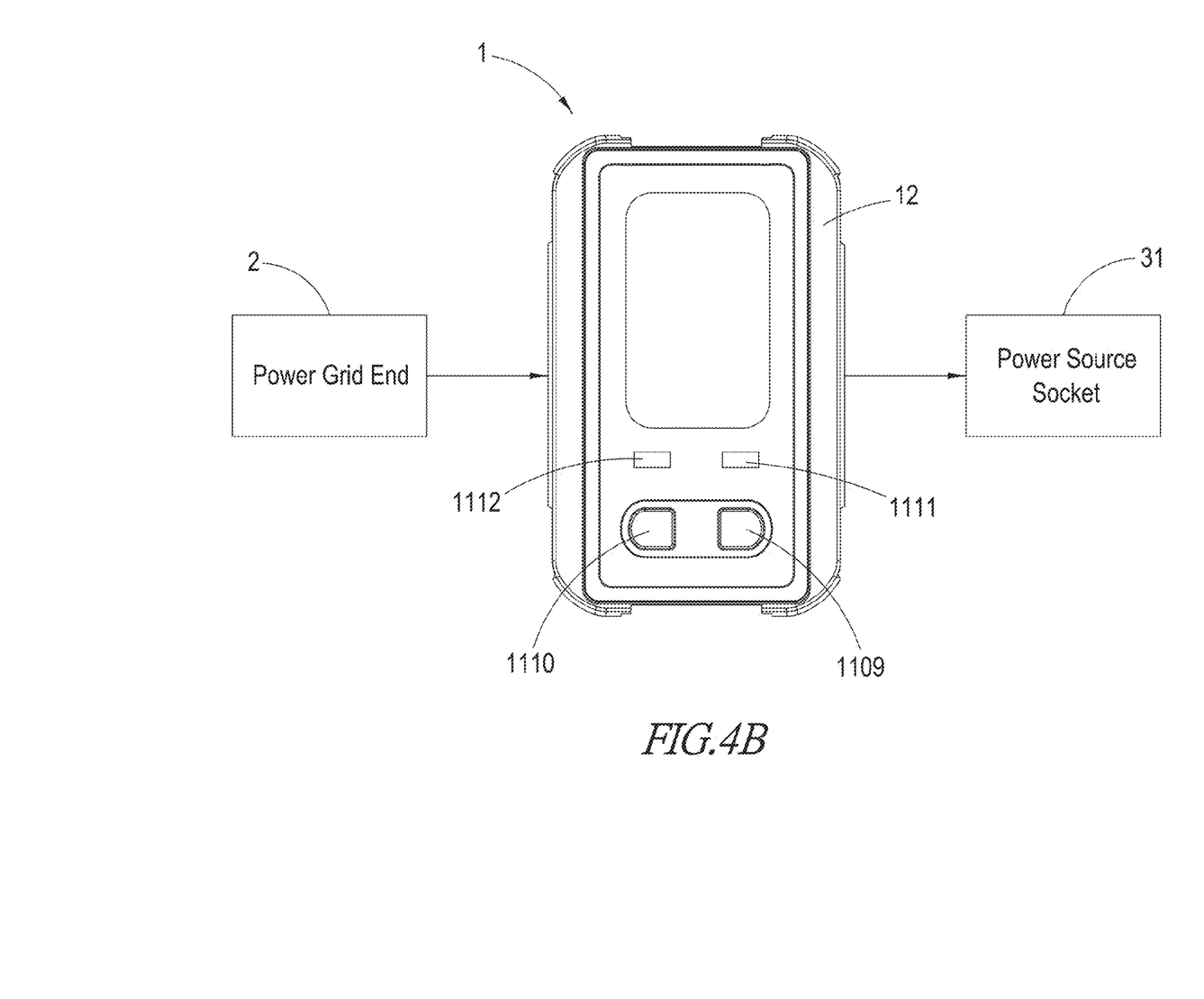
FIG. 4B shows an application architecture view of the timing system enabling near field communication controls according to the present invention.

It should be noticed that the timing controller 1 according to the present invention may be also applied to a variety of load ends 3; as shown in FIG. 4A, in which the load end may be a lamp body 31, and in case the timing controller 1 is electrically connected to the lamp body 31, it can control the switch on and off of the lamp body 31. However, in addition to the lamp body 31 depicted in FIG. 4A, the load end can be also an electric power socket 32, as shown in FIG. 4B, so that the timing controller 1 can control the enabled duration of power supply time at the electric power socket 32.

Figure 5:
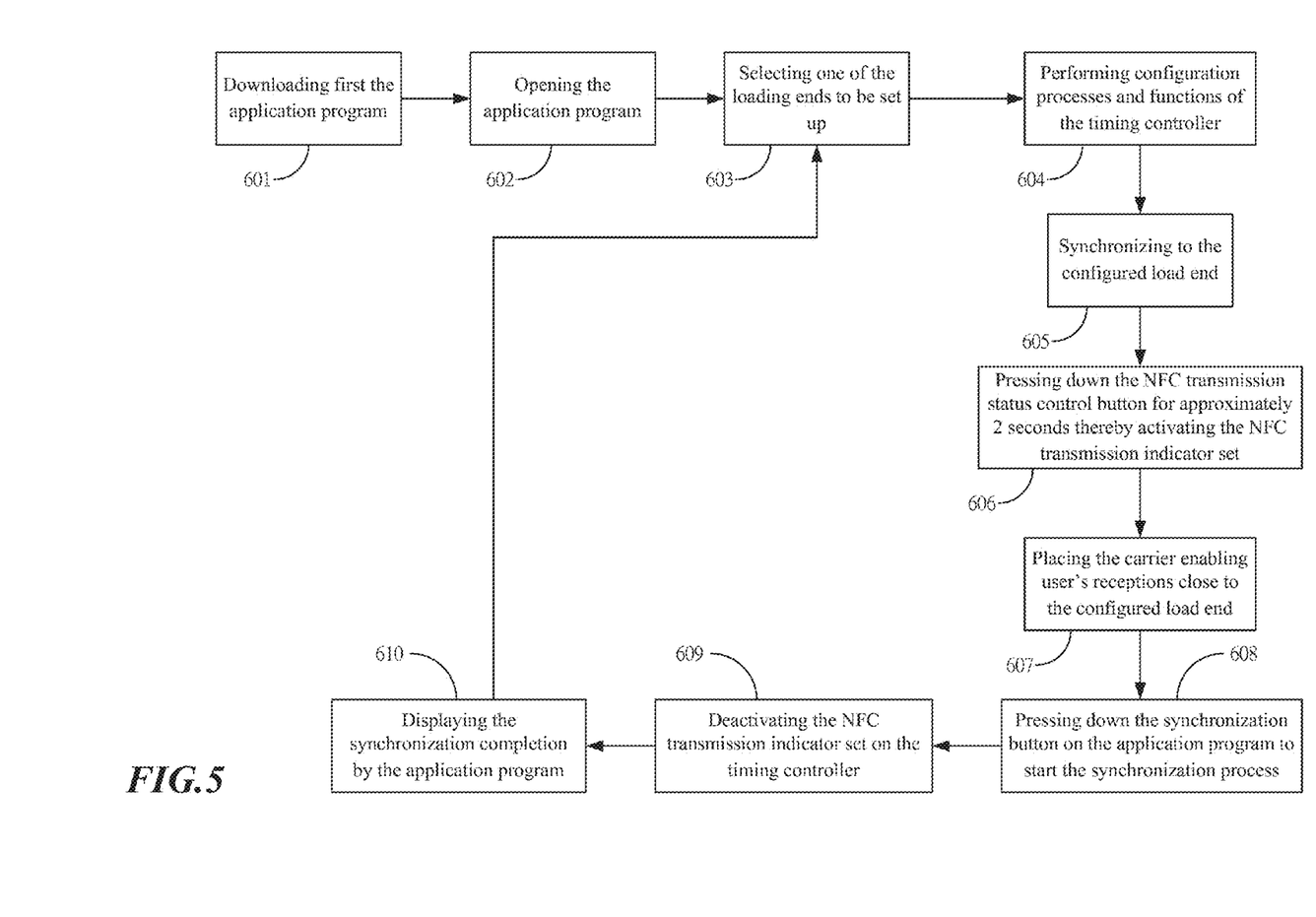
FIG. 5 shows an NFC transmission flowchart of the timing system enabling near field communication controls according to the present invention.

Seeing that the configured power supply parameters need to be transferred by means of NFC in the present invention, as shown in FIG. 5, the NFC transmissions may be performed as below:

(1) downloading first the application program (601), opening the application program (602), and then selecting one of the loading ends to be set up (603);

(2) performing configuration processes and functions of the timing controller (604) and synchronizing it to the configured load end (605), in which the synchronization requires to press down the NFC transmission status control button for approximately 2 seconds thereby activating the NFC transmission indicator set (606); after this, placing the carrier enabling user's receptions close to the configured load end (607);

(3) afterward, pressing down the synchronization button on the application program to start the synchronization process (608), and upon completing the synchronization, the data transmission being done, thus deactivating the NFC transmission indicator set on the timing controller (609), and finally displaying the synchronization completion by the application program (610).

Figure 6A:
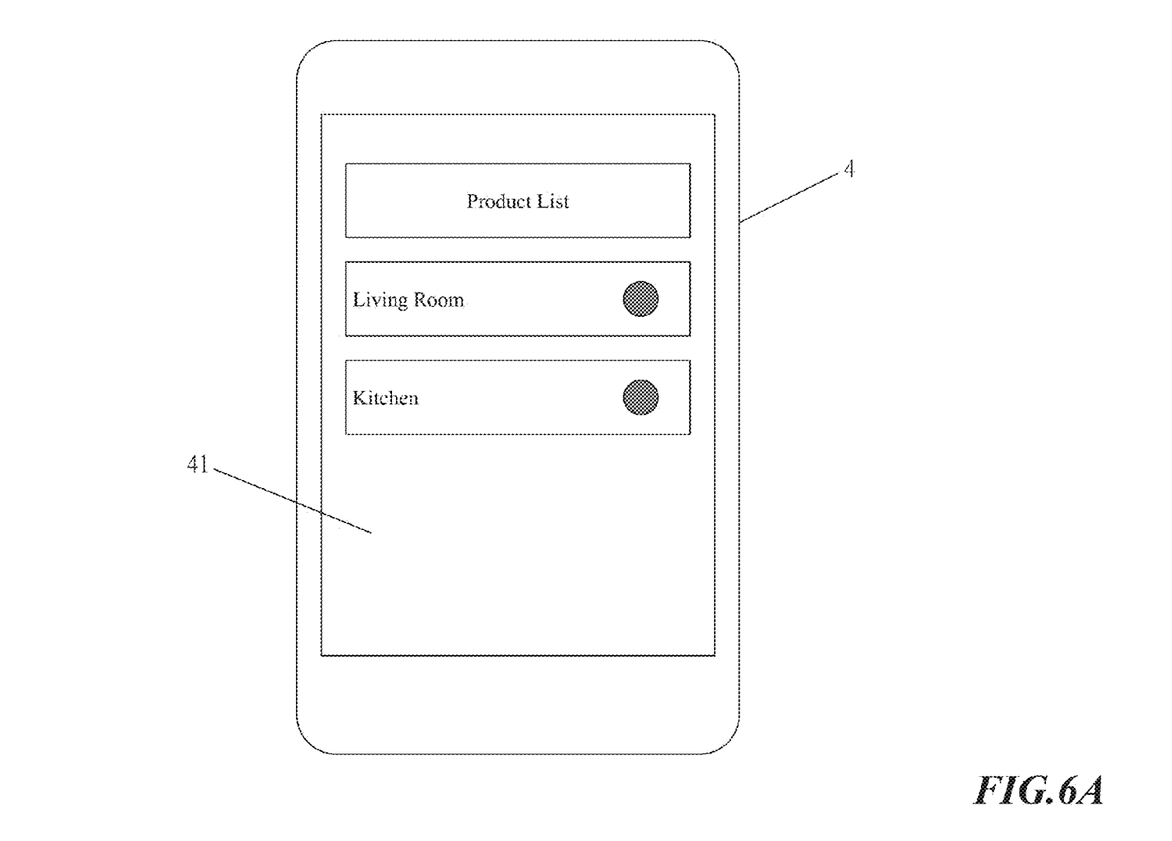
FIG. 6A shows an operation interface view of the application program utilized in the timing system enabling near field communication controls according to the present invention.
Figure 6B:
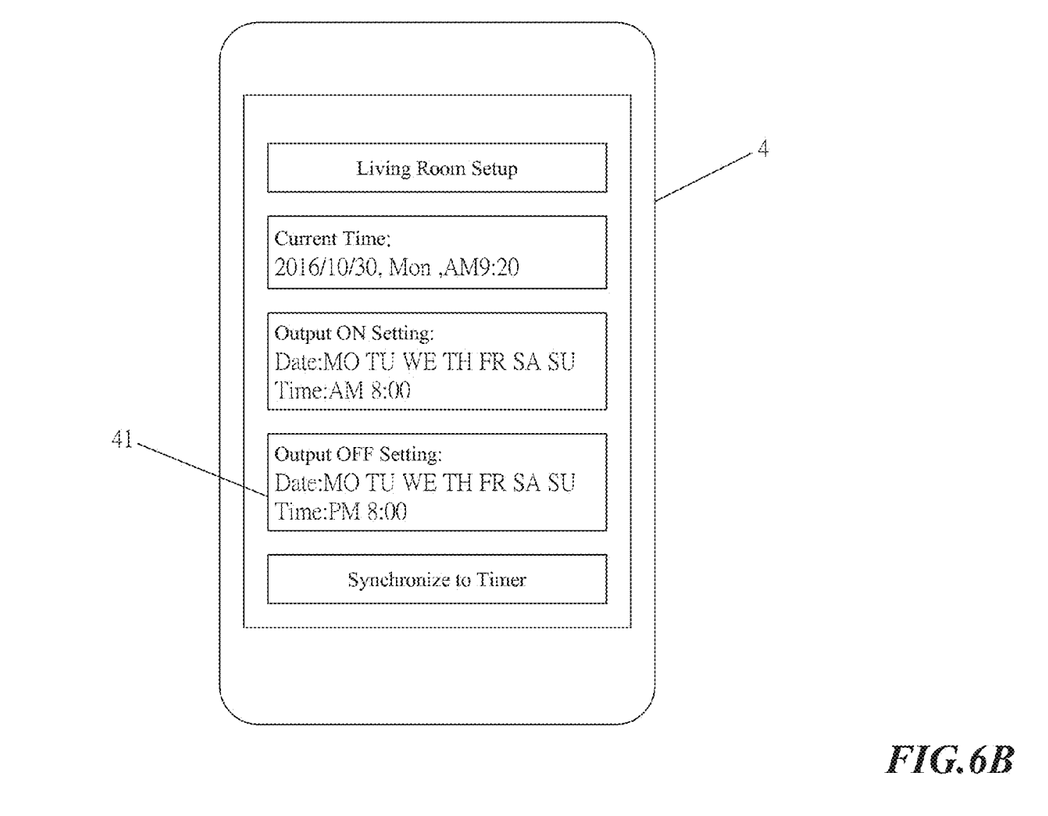
FIG. 6B shows an operation interface view of the application program utilized in the timing system enabling near field communication controls according to the present invention.

Meanwhile, FIGS. 6A and 6B show the screen shots of the application program 42, and it can be understood from FIG. 6A that the user is required to select to control the load end located in the "living room" or "kitchen"; in case the user selects "living room", as shown in FIG. 6B, it is possible to configure the power supply setup parameters; therefore, after completing this setup operation, as the process shown in FIG. 5, the user can press down the "Synchronize to Timer" so that the timing controller can control the power supply time of the load end based on the received power supply time parameters.

Furthermore, the aforementioned carrier can be a handheld device, including mobile phones, tablet computers or other handheld apparatus equipped with a display device.

In comparison with other conventional technologies, the timing system enabling near field communication controls according to the present invention provides the following advantages:

(1) The present invention allows to previously configure the power supply setup parameters by means of an APP and transfer the configured power supply time parameters to the timing controller in a form of NFC, so that, after the timing controller receives such configured power supply time parameters, it is possible to further control the load end electrically connected to the power supply time parameters thereby controlling the power supply status of the load end based on the received power supply time parameters; hence, the user can conveniently achieve the objective of power supply controls at the load end merely through pressing down the application program.

(2) The present invention enables power supply controls over multiple load ends.

(3) The present invention allows to remove the installations of any timing buttons and liquid crystal displays, thus greatly reducing required manufacture costs and facilitating the optimal economic efficiency.

It should be noticed that, although the present invention has been disclosed through the detailed descriptions of the aforementioned embodiments, such illustrations are by no means used to restrict the scope of the present invention; that is, skilled ones in relevant fields of the present invention can certainly devise any applicable alternations and modifications after having comprehended the aforementioned technical characteristics and embodiments of the present invention without departing from the spirit and scope thereof. Hence, the scope of the present invention to be protected under patent laws should be delineated in accordance with the claims set forth hereunder in the present specification.

What is claimed is:

1. A timing system enabling near field communication (NFC) controls, comprising:
    a timing controller, electrically connected to a power grid end and at least a load end, in which the timing controller includes:
        an alternative current (AC) power source input module, used to input AC power;
        a direct current (DC) power source supply module, which is electrically connected to the AC power source input module and used to convert the AC power into the DC power;
        an AC power source output module, which is electrically connected to a load end in order to output the AC power to the load end;
        a relay, which is electrically connected to the AC power source input module, the DC power source supply module and the AC power source output module, wherein the relay is used to control whether the AC power inputted by the AC power source input module should pass through the relay to supply the power to the AC power source output module such that the AC power source output module can output the AC power to the load end;
        a central control module, which is electrically connected to the DC power source supply module in order to control the integral operation mechanism of the timing system enabling near field communication controls;
        a relay driver circuit, which is electrically connected to the central control module and the relay, in which the central control module is able to connect to the relay by means of the relay driver circuit such that electric power can be supplied to the AC power source output module;
        a near field communication transceiving controller, electrically connected to the central control module and the DC power source supply module, and further electrically connected to an NFC antenna so as to transfer and receive at least an NFC signal, the NFC transceiving controller being able to process the received and transferred NFC signals;
        a power supply status indicator set, including at least a power supply status indicator and electrically connected to the central control module, in which the actions of the power supply status indicators represent the power supply output status;
        a near field communication transmission indicator set, including at least an NFC transmission indicator and electrically connected to the central control module, in which the actions of the NFC transmission indicators represent the NFC signal transmission status;
        a power supply status selection control button, electrically connected to the central control module, in which the power supply status selection control button can be pressed down to control the power source output status;
        a near field communication transmission status control button, electrically connected to the central control module, in which the near field communication transmission status control button can be pressed down for a certain duration of time to enable the near field communication transmission indicator set and start to transmit NFC signals;
    a carrier, having a near field communication antenna and installed with an application program, in which the carrier can perform NFC signal receptions and transfers with the timing controller and the application program comprises:
        a power supply setup module, used to configure the power supply setup parameters of the time controller and transfer such power supply setup parameters to the timing controller in a way of NFC signals, such that the near field communication transceiving controller can transfer the received power supply setup parameters to the central control module which then adjusts the power supply status of the load end in accordance with the power supply setup parameters; and
        an operation interface module, electrically connected to the power supply setup module thereby providing the operation interface for executions of the application program.

2. The timing system enabling near field communication controls according to claim 1, wherein the enabled power supply status indicator set can light on thus indicating power supply is activated.

3. The timing system enabling near field communication controls according to claim 1, wherein the disabled power supply status indicator set can light off thus indicating power supply is deactivated.

4. The timing system enabling near field communication controls according to claim 1, wherein the near field communication transmission indicator set can light on thus indicating the start of NFC signal transmission receptions.

5. The timing system enabling near field communication controls according to claim 1, wherein the near field communication transmission indicator set can blink thus indicating receiving NFC signal transmissions.

6. The timing system enabling near field communication controls according to claim 1, wherein the near field communication transmission indicator set can light off thus indicating the end of NFC signal transmission receptions.

7. The timing system enabling near field communication controls according to claim 1, wherein the near field communication transmission status control button can be pressed down for 2 seconds to enable the near field communication transmission indicator set to light on and start to transmit NFC signals.

8. The timing system enabling near field communication controls according to claim 1, further comprising a reset circuit electrically connected to the central control module, in which the reset circuit is, upon repowering, used to provide the central control module with the reset signal.

9. The timing system enabling near field communication controls according to claim 1, further comprising a potential boost circuit electrically connected to the central control module and the near field communication transceiving controller, in which the potential boost circuit can be applied to elevate the potential of the signals transmitted by the near field communication transceiving controller.

* * * * *